(12) United States Patent  
Imai

(10) Patent No.: US 6,990,659 B1  
(45) Date of Patent: Jan. 24, 2006

(54) DEVICE FOR REWRITING SOFTWARE PROGRAMS IN PERIPHERAL DEVICES CONNECTED TO A NETWORK

(75) Inventor: Masaaki Imai, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/277,373

(22) Filed: Mar. 29, 1999

(30) Foreign Application Priority Data

Mar. 30, 1998 (JP) .............................. P10-083856

(51) Int. Cl.  
*G06F 9/44* (2006.01)

(52) U.S. Cl. ...................... 717/171; 717/176; 709/242; 709/246

(58) Field of Classification Search .................. 717/11, 717/168–178; 710/8, 61–72, 15; 709/202–246; 719/321, 327  
See application file for complete search history.

(56) References Cited

U.S. PATENT DOCUMENTS

| 5,706,431 | A | * | 1/1998 | Otto ............................ 709/742 |
| 5,737,536 | A | * | 4/1998 | Herrmann et al. ........... 709/742 |
| 5,815,722 | A | * | 9/1998 | Kalwitz et al. .............. 717/167 |
| 5,974,474 | A | * | 10/1999 | Furner et al. ................... 710/8 |
| 6,009,274 | A | * | 12/1999 | Fletcher et al. ............... 717/11 |
| 6,161,125 | A | * | 12/2000 | Traversat et al. ............ 709/203 |
| 6,212,557 | B1 | * | 4/2001 | Oran ........................... 709/221 |

* cited by examiner

*Primary Examiner*—Tuan Dam  
*Assistant Examiner*—Chuck Kendall  
(74) *Attorney, Agent, or Firm*—Oliff & Berridge, PLC

(57) ABSTRACT

A printer determines in S11 to S15 whether any device connected to the network is the same type of device. Then the printer determines which of these same type devices have firmware older than firmware of the printer (S23). With respect to each device with older firmware (S23:YES), the firmware of the device is rewritten in S27 based on the firmware of the printer. As a result, the firmware of devices connected to the network can be easily rewritten. All other devices that are the same type as the printer can have their firmware updated into a firmware at least as new as the version stored in the printer. Accordingly, labor required to manage the network system can be greatly reduced.

12 Claims, 6 Drawing Sheets

DEVICE FOR REWRITING SOFTWARE PROGRAMS IN PERIPHERAL DEVICES CONNECTED TO A NETWORK

BACKGROUND OF THE INVENTION

1. Field of the Invention

The present invention relates to a program rewriting device which rewrites its own software programs or software programs stored in other devices connected to the network.

2. Description of the Related Art

Peripheral devices, such as printers, can be connected to a personal computer directly or through a network. Each peripheral device includes a ROM or other type of memory that stores software programs for executing processes of the peripheral device. Recently, it has been proposed to store the software programs in a rewritable memory, such as a flash ROM, so the programs can be rewritten by performing special operations. This would enable the programs to be rewritten to correct bugs in the software or to add new functions to the peripheral device.

However, each time this type of program needs to be rewritten, the overseer of the network must perform the troublesome task of determining the need to rewrite the program separately for each personal computer and each printer.

Recently, a network printer system has been extensively used. This system includes a plurality of printers and a plurality of personal computers connected to each other through a network. Such a system would enable image data transmitted from one of the personal computers to be printed out using a free printer, that is, a printer that is not presently being used by any of the other computers. However, with such a system, the some operation for rewriting programs would often need to be performed for all of the printers connected to the network. The program must be rewritten for each printer, one printer at a time. For this reason, management of a network system, such as the above-described printer system, would require a great deal of labor and effort.

SUMMARY OF THE INVENTION

It is an object of the present invention to provide a program rewriting device, a network system including such a program rewriting device, and a recording medium for realizing the program rewriting device and the network system, capable of simply executing rewrite of programs in devices connected to a network.

According to one aspect of the present invention, there is provided a program rewriting device that includes: a transmission unit that performs transmission and reception of data over a network to and from another device and other devices connected to the network; a memory that stores a software program; a type judgement unit that judges whether another device stores, in a rewritable manner, the same type of software program as the software program stored in the memory; an old/new judgement unit that, when the type judgement unit judges that the another device stores the same type of software program in a rewritable manner, judges which of the same type of software program stored in the another device and the software program stored in the memory is older; and a first rewrite unit that, when the now/old judgement unit judges that the same type of software program stored in the another device is older than the software stored in the memory, rewrites the same type of software program stored in the another device in the manner of the software program stored in the memory.

With this configuration, when the devices are connected to the network, then the ages of the software program stored in the memory and the software program stored in those devices are compared. When the program stored in other devices is older than the program stored in the memory, then the program in other devices can be automatically rewritten in the manner of the program stored in the memory. Accordingly, by connecting other devices to the network, programs stored in all other devices can be easily rewritten. Also, the labor required to manage the network system can be greatly reduced.

The memory may store the software program in a rewritable manner. In such a case, it is preferable to further include a second rewrite unit that, when the old/new judgement unit judges that the same type of software program stored in the another device is newer than the software stored in the memory, rewrites the software program stored in the memory in the manner of the same type of software program stored in the another device.

The memory is automatically rewritten in the manner of the same type program stored in the another device, either when the another device is newly connected to the network, or when the another device has been connected for a time, but has its program rewritten into a version newer than the version of the program stored in the memory. Accordingly, by configuring a network system in a manner described above, programs of the devices connected to the network can be easily rewritten and labor required to manage the network system can be greatly reduced.

According to another aspect of the present invention, there is provided a program rewriting device that includes: a transmission unit that performs transmission and reception of data over a network to and from another device and other devices connected to the network; a memory that stores a software program in a rewritable manner; a type judgement unit that judges whether the another device stores the same type of software program as the software program stored in the memory; an old/new judgement unit that, when the type judgement unit judges that the another device stores the same type of software program, judges which of the same type of software program stored in the another device and the software program stored in the memory is newer; and a rewrite unit that, when the old/new judgement unit judges that the same type of software program stored in the another device is newer than the software stored in the memory, rewrites the software program stored in the memory in the manner of the same type of software program stored in the another device.

When the program rewriting device is connected to the network, and also when a new device is connected to the network system, wherein the new device is a device according to the present invention or another device with a rewritten program, the same types of programs in all device of the network can be automatically rewritten to the newest version program of all the devices. Management of the network can be made even easier and labor required to manage the network system can be reduced even further.

It is preferable that the type judgement unit perform judgement for all other devices connected to the network, and the old/new judgement unit performs judgement on all other devices that are judged to store the same type of software program by the type judgement unit.

The type judgement unit performs the above-described judgement with respect to all other devices connected to the network. Further, the old/new judgement unit performs the above-described judgment with respect to all other devices judged by the same type judgement unit to store the same type of program. As a result, programs are written in the above-described manner based on the judgement results of the old/new judgement unit. For this reason, programs of all other devices connected to the network can be automatically rewritten.

"All other devices" refers to all remote devices connected to the same segment as the present device in the case when a network is divided into a plurality of segments, called management areas, by a rooter, a bridge, or gateway, and the like.

According to still another aspect of the present invention, there is provided a network system that includes a network; a program rewriting device connected to the network; another device connected to the network and having a memory that stores, in a rewritable manner, a software program; and other devices connected to the network, each having a memory that stores, in a rewritable manner, a software program. The program rewriting device as described above is connected to the network. However, at least one of the program rewriting device and the another device includes a rewrite prevention unit that prevents rewrite of the software program stored in the memory of at least one of the program rewriting device and the another device. The first rewrite unit or second rewrite unit does not rewrite the software program that the rewrite prevention unit prevents the rewrite of.

At least one of the present device or the one of other devices connected to the network are provided with the rewrite prevention unit. The rewrite prevention unit prohibits the first or second rewrite unit from rewriting programs that are prohibited to be rewritten by the rewrite prevention unit. When the program rewriting device and the another device are connected to the network, the rewrite prevention unit prevents the same type of program from being rewritten into a never version. For this reason, when a device stores data that can only be rewritten or be processed using an old program, then that device can have its program maintained without the program being rewritten.

According to yet another aspect of the present invention, there is provided memory medium storing programs including: a first program of judging whether a device connected to a network stores, in a rewritable manner, the same type of software program as a software program stored in a reference memory connected to the network; a second program of judging which of the same type of software program stored in the device and the software program stored in the reference memory is older when the device is judged to store the same type of software program in a rewritable manner; and a third program of rewriting the same type of software program stored in the device in the manner of the software program stored in the reference memory when the same type of software program stored in the device is judged to be older than the software stored in the reference memory.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENT

An embodiment of the present invention will be described while referring to the accompanying drawings. The embodiment is directed to a network system including a plurality of printers and personal computers. Because the printers and the personal computers are connected to each other by a network, the personal computers can print images, text, and the like using the printers.

Figure 1:
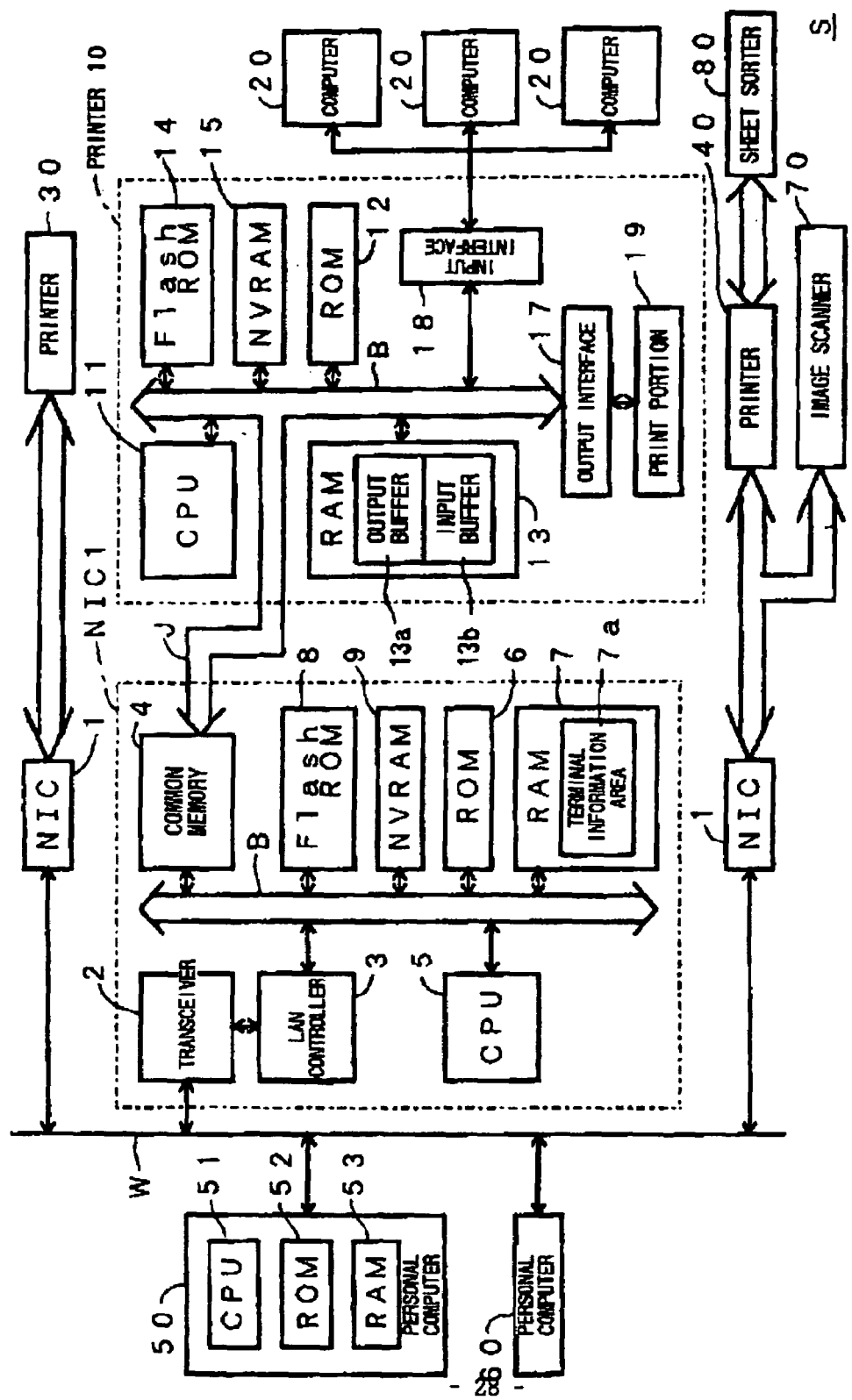
FIG. 1 is a block diagram showing configuration of a network system according to an embodiment of the present is invention.

First, configuration of the network system S according to the embodiment will be described while referring to FIG. 1. The network system S includes a network W, such as a telephone circuit or a LAN; a plurality of NICs 1 for performing transmission and reception of data over the network W; printers 10, 30, 40; personal computers 50, 60 that are connected to the network W; computers 20, 20, 20 that are connected to the printer 10; an image scanner 70 connected to the network W in parallel with the printer 40; and a sheet sorter 80 connected in series with the printer 40. All of the printers 10, 30, and 40 are of different type. It should be noted that the personal computer 50 has a well-know configuration including a CPU 51, a ROM 52, and RAM 53, and that the personal computer 60 has the same configuration.

Each NIC 1 is configured from a transceiver 2, a LAN controller 3, a shared memory 4, a CPU 5, a ROM 6, a RAM 7, a flash ROM 8, and an NVRAM (non-volatile RAM) 9, all connected to each other by a bus B. The RAM 7 includes an internal terminal information area 7a.

The printer 10 is configured from a CPU 11, a ROM 12, a RAM 13, a flash ROM 14, an NVRAM 15, an output interface 17, and an input interface 18, all connected by another bus B'. A print portion 19 is connected to the output interface 17. The RAM includes an internal output buffer 13a and an internal input buffer 13b. The printer 10 is connected to the NIC 1 through a connection line J, which is connected to the bus B', and to the computers 20 through the input interface 18.

Next, general operations of the network will be described while referring to FIG. 1. The following description will be provided for processes performed between the NIC 1 and the printer 10. The following processes are also performed in the same manner between the other NICs 1 and corresponding printers 30, 40.

The CPU 51 in the personal computer 50 generates data to be transmitted to the printer 10 or to the NIC 1 connected to the printer 10. Transmission of data is executed in a protocol appropriate for the target device. For example, data to be processed by the NIC 1 is transmitted using Trivial File Transfer Protocol (TFTP), data to be processed by the printer 10 is transmitted using Line Printer Remote (LPR), and data with no particular designated processing device is transmitted using User Datagram Protocol (UDP). The transceiver 2 that receives the data demodulates it and outputs the demodulated data to the bus B via the LAN controller 3. The LAN controller 3 controls reception and transmission of data over the network W between the NIC 1 and the personal computer 50.

When the NIC 1 receives data that was transmitted using TFTP, then the CPU 5 processes the data using information stored in the ROM 6 and the flesh ROM 8. Information needed to process the received data is retrieved and temporarily stored in the RAM 7 in a retrievable manner. The CPU 5 then transmits the processed data back to the source of the transmission, that is, to one of the personal computers 50, 60 or another NIC 1, through the bus B, the LAN controller 3, the transceiver 2, and the network W.

When the data received by the NIC 1 was transmitted using LPR, the CPU 5 transfers the data to the printer 10 via the shared memory 4 and the connection line J. That is, after the data is written in the shared memory 4, the CPU 5 generates an interrupt command and transmits the interrupt command to the CPU 11 over a signal line (not shown in the drawings) so that the CPU 11 processes the data in the shared memory 4. It should be noted that control programs required for the CPU 5 to process the above-described data are prestored in the ROM 6.

The shared memory 4 is a memory for temporarily storing information to be used by both the NIC 1 and the printer 10 during information processing.

When data to be processed by the printer 10, that is, data transmitted from either the personal computer 50 or 60 using LPR, is transmitted to the NIC 1 and inputted to the printer 10 over the connection line J, the CPU 11 retrieves the data via the bus B and then processes the data using data stored in the ROM 12 and the flash ROM 14. Afterward, the CPU returns the processed data to the NIC 1 over the bus B', the connection line J, and the shared memory 4. Information required for processes by the NIC 1 is temporarily stored in a readable manner in the RAM 13. Control programs required for processes by the CPU 11 are prestored in the ROM 12 of the flash ROM 14.

The NIC 1 receives results from the printer 10 about the data processed in the printer 10. The NIC 1 transfers the process results as is over the network W to one of the personal computers 50, 60 or to another one of the printers 30, 40.

Data outputted from each of the computers 20, representing images to be printed out by the printer 10, is retrieved by the printer 10 over the input interface 18 and stored in the input buffer 13b via the bus B'. The data is then developed into print data and temporarily stored in the output buffer 13a. Then, the print data is outputted to the print portion 19 through the bus B' and the output interface 17. The print portion 19 then forms an image corresponding to the data onto a recording medium, such as a paper sheet. When one of the personal computers 50 or 60 outputs data for printing images and the like to the printer 10 over the network W and the NIC 1, the printer 10 stores the data in the input buffer 13b. The data stored in the input buffer 13b is developed into print data in the same manner described above. Print output processes of the printer 10 are executed under control of the CPU 1 based on control programs stored in the ROM 12 and the flash ROM 14.

All the printers 10, 30, 40 in the network system S use the same type of NIC 1. However, the printers themselves are different models. Each printer stores device information to be described later in its ROM 12. The device information differs for each printer type and corresponds to differences in printer mechanisms, types of data that the printer can handle, and the like. As will be described later, version and other information is stored in the NVRAM 15. Although not shown in the drawings, other printers that use different types of NIC from the NIC 1 are also connected to the network W.

The flash ROMs 8, 14 have a well-known configuration that allows data stored therein to be rewritten and updated. Control programs, such as firmware, stored in the flash ROMs 8, 14 can be rewritten to update the functions of the printer 10 when new versions of the control programs are released. Processes relating to updating functions of the printer 10 will be explained next.

Figure 2:
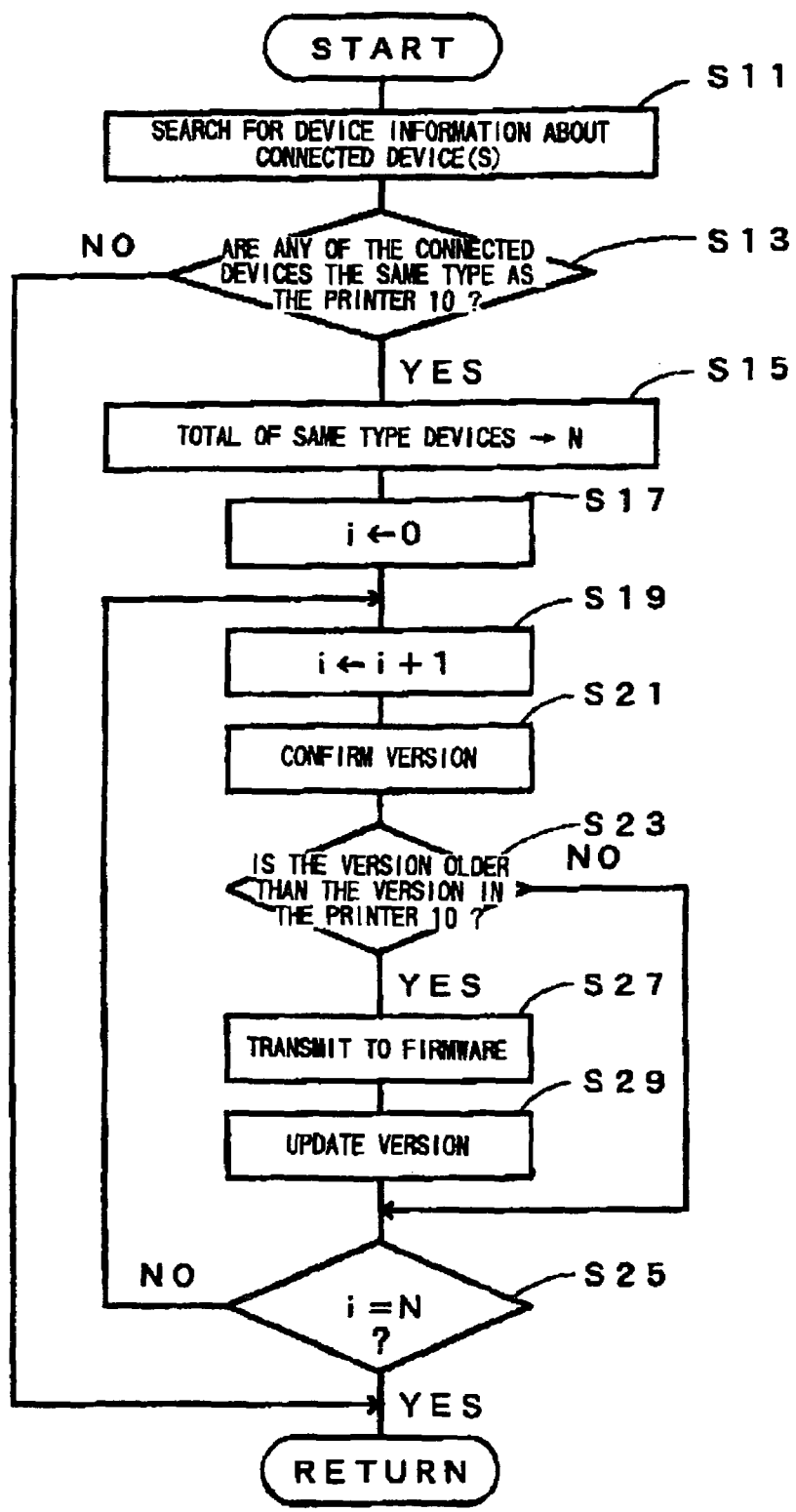
FIG. 2 is a flowchart representing processes executed by a printer of the system in FIG. 1.

FIG. 2 is a flowchart representing processes executed by the CPU 11 when the printer 10 is first connected to the network W. When this routine is started, in 611, the CPU 11 first searches for device information on all other devices, such as the printers 30, 40 and the scanner 70, that are also connected to the network W. According to the present embodiment, the network W is divided into a plurality of segments using bridges, rooters, or gateways, and the term "all other devices" refers to all other devices connected to the same segment as the printer 10. Accordingly, "all other devices" does not refer to all other devices connected to each other, for example, via the Internet.

Figure 3:
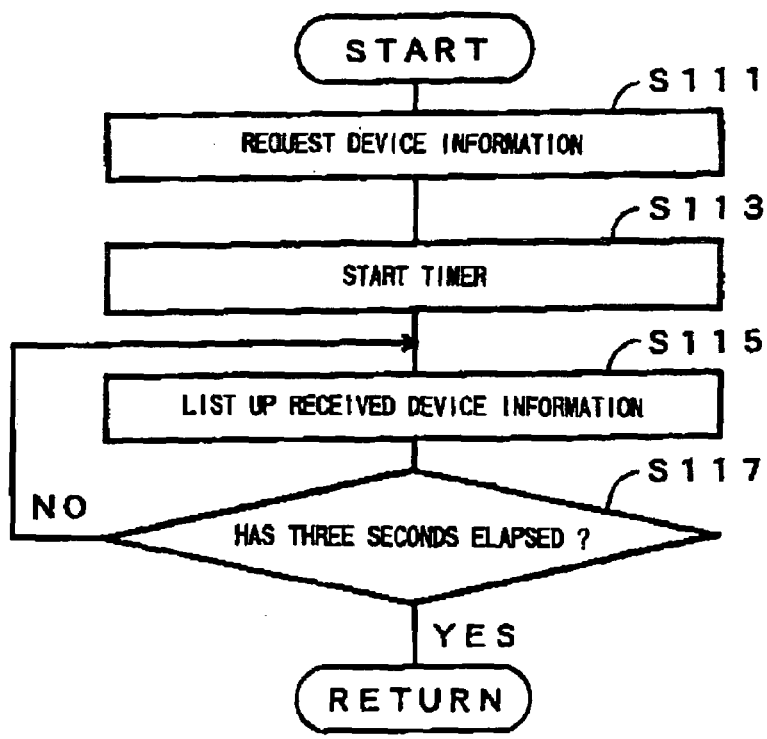
FIG. 3 is a flowchart showing details of a portion of processes represented by the flowchart in FIG. 2.

FIG. 3 is a flowchart representing details of processes performed by S11. As shown in FIGS. 3, in S11, first in S111, a broadcast packet for requesting device information is transmitted to all other devices connected to the network W. Next, in S113, the CPU 11 starts a timer for measuring at least a three-second interval. During the three-second interval, the printer 10 monitors for responses to the broadcast packet. Next in S115, the printer 10 receives device information from the other devices connected to the network W and stores the received device information in list form in a predetermined region within the RAM 13. The process in S115 is repeated until three seconds elapse from when the timer was started in S113. Once the three-second interval has elapsed (S117:YES), then the program proceeds to S13 of FIG. 2.

Upon reception of the broadcast packet, each device, such as the printer 30, generates a random number. Then each device waits a number of milliseconds corresponding to its random number, and then responds to the printer 10 with its device information. As a result, device information from each device is inputted into the printer 10 over the network W at various timings corresponding to the above-described random numbers. The device information is not detailed information such as the device information 100 shown in FIG. 4, but is rather information, such as an ID number, that designates the type of device. With this configuration, each device can respond with its device information even while performing processes, such as printing, without stopping those processes.

Next, returning to FIGS. 2, in S13, whether or not any of the other devices connected to the network W are the same type as the printer 10 is judged based on the device information, for example ID information, that was listed up in S115. When none of connected devices is the same device (S13:NO), then this routine returns. On the other hand, when the same type of device is present (S13: YES), then the routine proceeds to S15. For the following explanation, it will be assumed that several other printers, such as a printer 10', that are the same type of printer as the printer 10, are also connected to the network W, so that S13 results in a positive determination.

In S15, those devices that are not the same type as the printer 10 are removed from the list of S115 and a total device number N is set to equal the total number of devices in the list. Then in S17, a subject device number 1 is set to zero. The subject device number 1 represents the device from the list of S15, that is presently the subject of investigation. In S19, the subject device number 1 is incremented by one, so that the first printer of the devices in the list of S115 will be the subject of the following processes. In this example, it will be assumed that the printer 10' is the first printer on the list.

Next in S21, the version of the subject device, that is, printer 10', is confirmed. During S21, the printer 10 requests the printer 10' to provide detailed device information. In response to this request, the printer 10' sends the device information 100 shown in FIG. 4.

Figure 4:
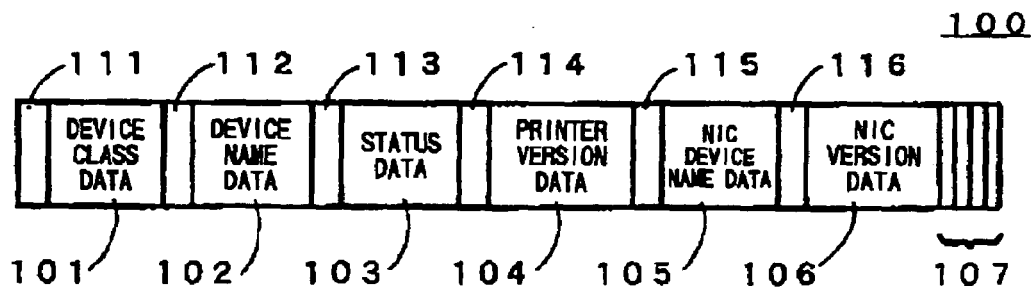
FIG. 4 is a block diagram showing configuration of device information used in the processes of FIG. 3.

As shown in FIG. 4, the device information 100 is configured from a variety of different information connected in series. The device information 100 includes printer 10' information 130, NIC information 140, and the Internet Protocol (IP) address 107 assigned to the printer 10'. The printer 10' information 130 includes device class data 101, which represents the device type of the printer 10', such as whether it is a laser printer or a color printer; device name data 102, which represents, for example, the model number assigned to the printer 10'; status data 103, which represents the present condition of the printer 10', and printer version data 104, which represents the version of the firmware stored in the flash ROM 14 of the printer 10'. The NIC information 140 includes NIC device name data 105 and NIC version data 106. Also, data length data 111–116 is appended before corresponding data sets 101–107, to indicate the length of the corresponding data sets 101–107.

Returning to FIGS. 2, in S21, the version of firmware stored in the flash ROM 14 of the printer 10' is confirmed based on the printer version data 104 of the received device information 100. In S23, the version of the firmware confirmed in S21 is compared with the device firmware of the printer 10, as indicated by data in the flash ROM 14. When the firmware of the printer 10' is never than or the same as the firmware are of the printer 10 (S23:NO), then the program proceeds to S25. In S25, whether or not the subject device number 1 equals the total device number N is determined. When the subject device number 1 does not equal the total device number N (S25:NO), then the program returns to S19, whereupon the subject device number 1 is incremented by one. Then, the processes of S21 to S25 are repeated for the next ith device in the list of S15.

On the other hand, if it is determined in S23 that the firmware of the printer 10' is older than the firmware of the printer 10 (S23:YES), then the program proceeds to S27, and then to S29. First in S27, the printer 10 transmits a copy of the firmware stored in its flash ROM 14 to the printer 10'. The header of the firmware data is appended with data indicating that the printer 10' should rewrite the firmware in its flash ROM 14' according to the received firmware copy. When the printer 10' receives the firmware data, it uses a rewrite program prestored in its ROM 12' to rewrite the firmware in its flash ROM 14' to match the firmware received from the printer 10. It is conceivable that the printer 10' is performing another process, such as printing, when it receives the firmware data from the printer 10. In this case, it is desirable that the printer 10' wait until it completes the process before rewriting the firmware. Otherwise, the process might be performed in a different manner before and after rewrite, so that the results of the process will be different before and after rewrite. For example, if the printer 10' rewrites firmware while it is printing, then pages printed before rewrite and pages printed after rewrite might be printed in different formats. The firmware data can be stored in the printer 10 or the subject device itself until the printing or other process is completed.

The system can be configured so that any devices that are the target of rewrite operations transmit requests for rewrite to the printer 10. In this case, the printer 10 only transmits firmware to a target device after the printer 10 determines receipt of a rewrite request. With this configuration, firmware data is not transmitted to devices that do not transmit rewrite request.

Next in S29, the printer 10 confirms that the rewrite operation was successful, so that the printer 10' can update its version data. That is, after rewriting the firmware, the printer 10' transmits check SUM data to the printer 10 to check accuracy of the rewritten firmware. The printer 10 then transmits information indicating whether the check SUM was correct. After the CPU 11' of the printer 10' receives confirmation that the check SUM was correct, the CPU 11' updates version information stored in the NVRAM 15' of the CPU 11' to indicate that the present firmware in the flash ROM 10' is the new rewritten version. This version information corresponds to the printer version 104 of the device information 100.

Then, after S29, the program proceeds to S25. When any of the devices in the list from S15 remain unprocessed (S25:NO), the program returns to S19 and repeats the same processes described above. Once the processes of S19 to S25 are completed on all the same type devices connected to the network W (S25:YES), then this routine returns.

The printer 10 according to the present embodiment can automatically rewrite device firmware of all same type devices connected to the network W, into the firmware of the printer 10, whenever the firmware stored in the flash ROM of the same type device is older than the firmware stored in the flash ROM 14 of the printer 10. For this reason, firmware of devices connected to the network W can be easily rewritten. Devices can update the firmware of all of the same type devices, into the same or newer firmware as stored in its flash 14. Accordingly, labor required to manage the network system W can be greatly reduced.

In particular, in the case of image forming devices, such as the printers 10, 30, 40, the time required to mechanically operate the print portion 19 is much longer than the time required to process programs. For this reason, it is very desirable to connect a plurality of printers to the network W and enable forming images by those unused ones of printers. In this case, the situation will often arise wherein the same program in all of the printers connected the network W will need to be rewritten. The printer 10 according to the present invention is capable of automatically rewriting firmware of all same type printers connected to the network W as needed. Therefore, firmware of devices connected to the network W can be easily rewritten.

While the invention has been described in detail with reference to specific embodiments thereof, it would be apparent to those skilled in the art that various changes and modifications may be made therein without departing from the spirit of the invention, the scope of which is defined by the attached claims.

For example, in S11, or more particularly in S111, of the above-described embodiment, only ID data was requested as device information. However, the detailed device information 100 shown in FIG. 4 could be requested instead. In this case, there is no need to request the device information 100 in S21. However, with the configuration of the embodiment, time required for transmission can be reduced because device information 100 is requested only from the same type devices after it is determined whether or not each device connected to the network W is the same type as the printer 10.

It is assumption of the present embodiment that when two devices are the same type (S13:YBS), it is assumed that the same type of firmware is stored in the rewritable condition in the flash ROM of both devices. However, even though devices may be the same type, some of the devices may have completely different firmware or the firmware may be stored in the manner that can not be rewritten. In situations like this, after the same type of devices are determined in S13, then whether or not the same type of firmware is stored in a rewritable manner can be determined.

In the present embodiment, when it is judged in S23 that firmware of another device connected to the network W is older than the firmware in the printer 10 (S23:YES), then the firmware of the other device is rewritten in S27. However, the embodiment can be modified so that when the firmware of the other device is newer than the firmware of the present device, then the firmware of the present device can be rewritten to the never version of the other device.

Figure 5:
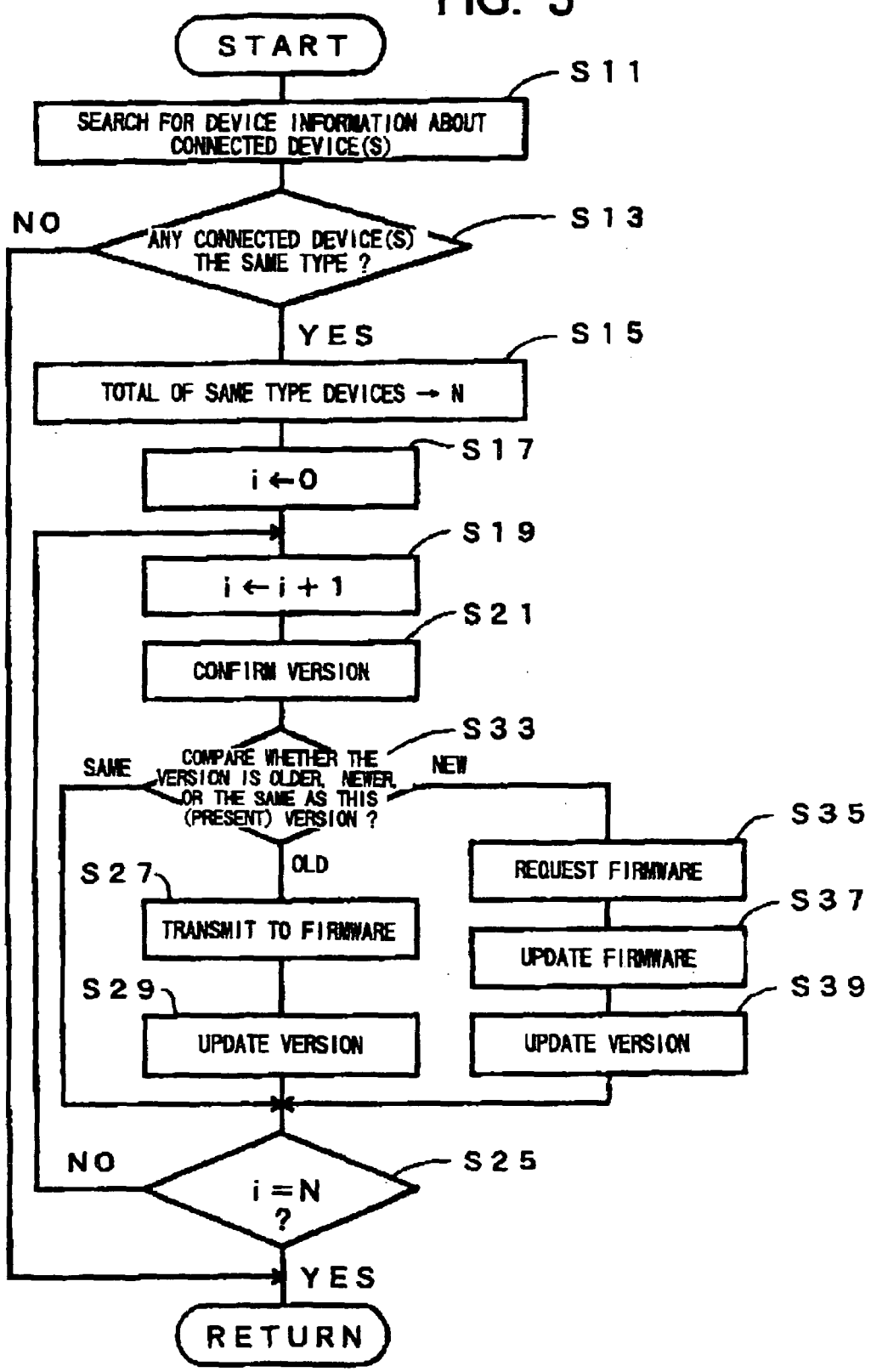
FIG. 5 is a flowchart representing processes performed according to a modification of the above-described embodiment.

FIG. 5 is a flowchart representing processes performed by the CPU 11 of the printer 10 in this case. It should be noted that the processes represented in FIG. 5 that are the same as in FIG. 2 are indicated by the same numbering. The following explanation will be provided for processes of FIG. 5 that are different from those of FIG. 2.

According to the modification of FIG. 5, after the version of the ith device is confirmed in S21, then in S33, whether or not the firmware version of the ith device is older, newer, or the same as the firmware version of the printer 10 is determined. When both of the firmware versions are the same, then the program proceeds to S25, whereupon processes of S19 and on are performed on the i+1st device.

When it is determined in S33 that the firmware of the remote device is older than the firmware of the present device, then the firmware of the remote device is rewritten in S27, S29 and the program proceeds to S25.

On the other hand, if it is determined in S33 that the firmware of the remote device is newer than the firmware of the present device, then the program proceeds to S35. In S35, the printer 10 transmits a request to the ith device, requesting that the ith device to transmit a copy of its firmware. After receiving the firmware copy from the ith device in response to the request, then in S37, the printer 10 rewrites the firmware stored in the flash ROM 14 according to the firmware copy. The printer 10 rewrites its firmware in this manner based on a program prestored in the ROM 12 of the printer 10. When it is judged that the rewriting operation is successfully performed, version information stored in the NVRAM 15 of the printer 10 is updated in S39 and the routine proceeds to S25.

According to this modification, the firmware stored in the flash ROM 14 of the printer 10 can be rewritten into the newest firmware of all the printers connected to the network W. Generally, the more recently the device was connected to the network W, the higher the probability that the firmware of the device will be the newest version. The processes shown in FIG. 5 are more effective when executed, for example, after the power of the printer 10 is turned on, or periodically, for example, every five to six hours. With this configuration, the firmware in the printer 10 can be updated in S37 to the newest firmware of all the devices in the network system network system S, either each time the power of the printer 10 is turned on, or every predetermined period of time. Further, when printer 10 has its firmware updated in S37 while processes S19 to S25 are serially performed for each printer i (i=1 to N) on the network W, the firmware in all of the other printers will be updated to the newest version in S27 the next time the processes S19 to S25 are performed.

Figure 6:
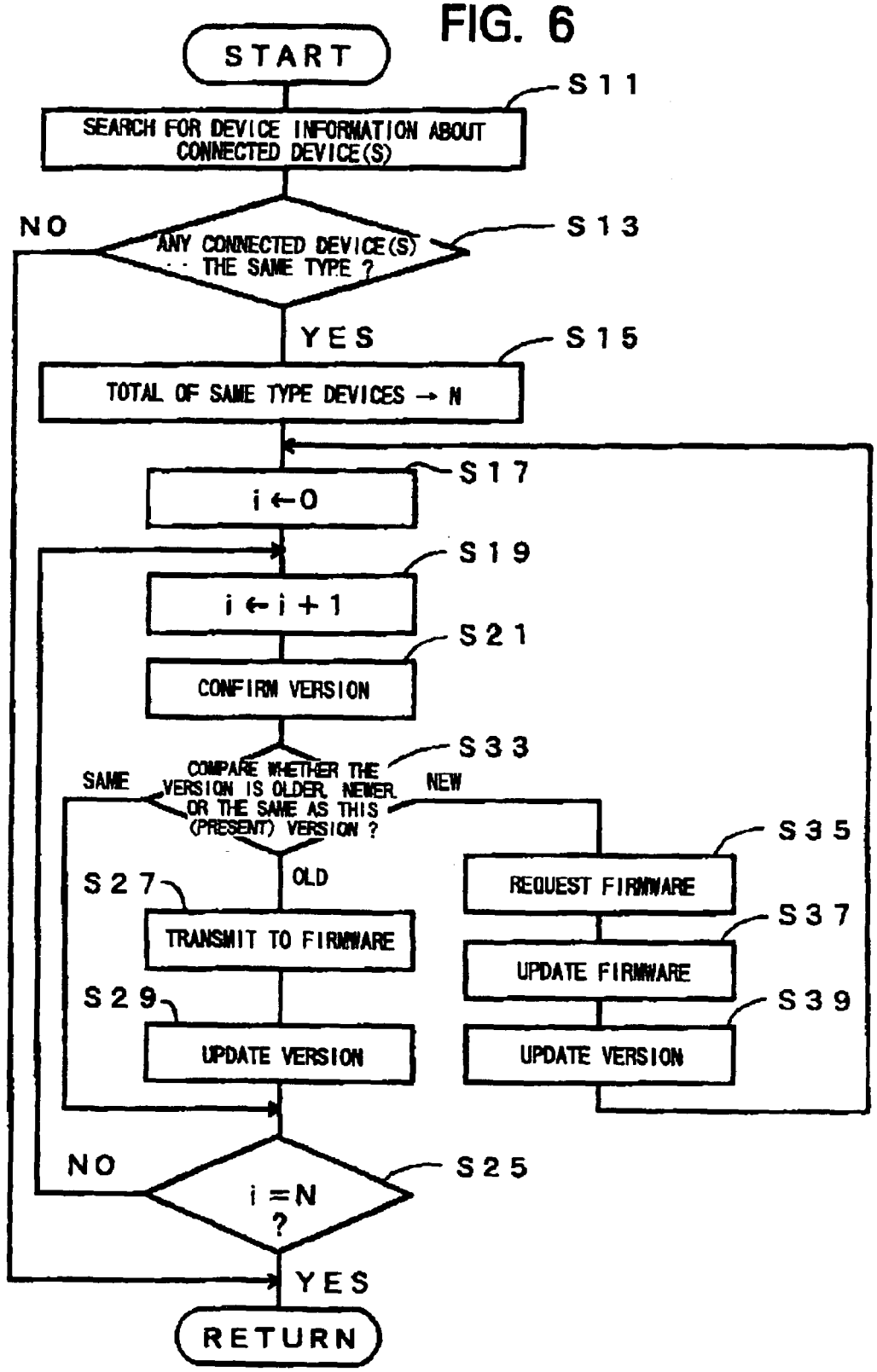
FIG. 6 is a flowchart representing processes performed according to a different modification of the embodiment.

The flowchart of FIG. 5 can be modified as shown in FIG. 6, so that the program proceeds to S17 after the firmware version of the printer 10 is updated in S39. With this configuration, because the subject device number 1 is reset to zero in S17 after the firmware version of the printer 10 is updated in S39, the processes of S19 to S25 will be repeated to update firmware in all of the devices connected to the network W. Accordingly, firmware of all other devices connected to the network W, including the printer 10, will be updated to the newest version. This is performed by a single process and is extremely easy and fast.

Processes of S2 can be executed each time the predetermined period of time elapses, or each time the power of all other devices connected to the network W, at least the printer 10 and the all same type devices, are turned on. Alternatively, in the following manner, the processes of FIG. 2 can be performed each time a new device is connected to the network W. That is, when a new device is connected to the network W, it transmits its ID to each of the other devices connected to the network W, including to the printer 10. The printer 10 executes the processes of FIG. 2 upon receiving the ID. In these situations, the firmware in the printer 10 and in all other same type devices connected to the network W will ultimately be updated into the newest firmware version of any of the devices. Also, when all of the devices connected to the network are capable of performing the processes of FIG. 6, the processes of S27 and S29 of FIG. 5 can be dispensed with. In other words, only in the case when the firmware of the ith device is newer than the firmware of the printer 10, will the printer 10 perform the processes of S35 to S39. In other cases, the program proceeds directly to S25. Since all device will be performing the same processes, all of the devices will have their firmware updated to the newest version.

Next, an explanation will be provided for when firmware is unsuccessfully rewritten in the processes of S27 or S37. The following two examples are conceivable. The processes can be terminated and reset, or rewrite operations can be repeated until successfully accomplished. In the latter case, when rewrite operations are still unsuccessful after repeating the rewrite operations a predetermined number of times, a message can be displayed indicating that rewrite operations were unsuccessful and reset can then be performed. Further, the printer 10 can be configured to enable the user to select which of the above methods he or she desires.

Figure 7:
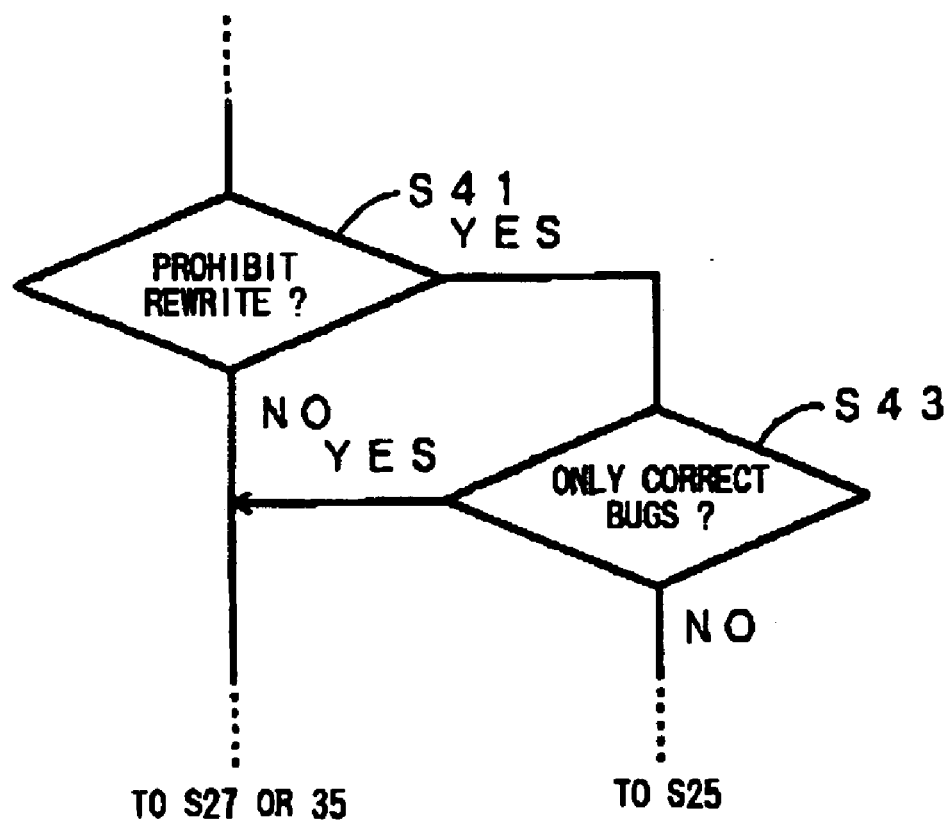
FIG. 7 is a flowchart showing a portion of processes according to still another modification of the embodiment.

There is a possibility that data received by the printer 10 can include data that can only be processed by old firmware. For example, foreign language font data that was used in an older version firmware is sometimes not included in newer versions of the same firmware. In this case, the processes in S41 and S43 of FIG. 7 can be inserted before S27 and S35, so that a portion of the program in the printer can be maintained without being rewritten.

In thin case, when it is determined that the firmware needs to be rewritten, that is, as a result of comparing firmware age in S23 or S33 (for example, S23: YES), then it is judged in S41 whether or not rewriting is prohibited. That is, it is determined whether or not the flash ROM 14 to be rewritten according to processes of S27 or S37 is set to prevent rewrite of the flash ROM 14. If rewrite is not prohibited (S41: NO), then the program proceeds to S27 or S35. When rewrite is prohibited (S41:YES), then the program proceeds to S43.

In S43, it is determined whether or not differences in old and new firmware include only correction of bugs. If the differences only include correction of bugs (S43:YES), then no problem will arise by rewriting the firmware, so the program proceeds to S27 or S35 whereupon the firmware is rewritten to correct bugs. On the other hand, if rewrite will change the firmware in a manner other than merely correcting bugs (S43:NO), then the program proceeds to S25 without rewriting the firmware.

By inserting the processes of S41 and S43 before the processes of S27 and S35, those devices set to prohibit rewrite can have their firmware maintained substantially as is without being rewritten. However, because bugs are corrected, the processes performed by the resultant firmware will have few errors. The judgement of S43 can be executed by directly comparing firmware of different devices. Alternatively, a data table can be provided in the ROM 12, for example, and referred to make the determination of S43. Further, inquiry can be made to the software company over the internet.

Further, the processes of S43 can be omitted. In this case, when it is determined in S41 that rewrite is prohibited (S41:YES), then the program can directly proceed to S25. In this case, devices set so that rewrite is prohibited can have their firmware maintained without the firmware being rewritten at all. Processes relating to prohibiting rewrite can be executed by rewrite program for rewriting the firmware.

While the invention has been described in detail with reference to specific embodiments thereof, it would be apparent to those skilled in the art that various changes and modifications may be made therein without departing from the spirit of the invention, the scope of which is defined by the attached claims.

For example, in S11, device information is requested in S111 for all other devices connected to the network W. However, device information can be requested only from a portion of the devices connected to the network W. In this case, those devices to be requested can be indicated in a device list. The device list can be obtained by the user inputting device names using an operation panel (not shown) on the printer 10 or using the personal computer 50. In S111, the remote device can transmit device information only when the remote device is the same type as the printer 10 and also when the device type it newer than the printer 10. Further, although reception of device information in S115 is cut off after three seconds in S117, reception can be continued until device information is received from all other devices.

In the embodiments, the flash ROM 14 was rewritten according to a rewrite program stored in the ROM 12. However, the flash ROM 14 can be rewritten by a rewrite program stored in the flash ROM 14 itself. In this case, the rewrite program is first copied into the RAM 13 or the NVRAM 15 and then rewrite processes are executed according to the copy of the program. In this case, the ROM 12 can be omitted so that the cost can be reduced.

The above-described processes can be applied in the same manner for rewriting firmware stored in the flash ROM 8 in the NIC 1. Further, the present invention is not limited to use with a printer system, which is a network system centered on image forming devices, such as the printer 10. The present invention can also be applied to a karaoke transmission system or other types of network systems. A variety of other memory media other than RAMs and ROMs can be used. For example, a CD-ROM or a floppy disk can be used. A program cartridge that can be inserted in a card slot can be used. Also a file server connected to the Internet can be used.

Further, the program rewrite device according to the present invention can be a personal computer, or a file server for transmitting and receiving software programs such as firmware between printers, computers, and other devices.

What is claimed is:

1. A peripheral device connected to a network comprising:
    a device judgment unit that judges whether another peripheral device, that is a same type as the peripheral device, is connected to the network;
    a transmission unit that performs transmission and reception of data over the network to and from the another peripheral device;
    a memory that stores a software program in a rewritable manner, the software program being software used by the peripheral device for executing prescribed operations;
    a type judgment unit that judges whether the another peripheral device stores, in a rewritable manner, a same type of software program as the software program stored in the memory, the same type of software program being software to be used by the another peripheral device for executing prescribed operations;
    an old/new judgment unit that, when the device judgment unit judges that another peripheral device is connected to the network and the type judgment unit judges that the another peripheral device stores the same type of software program in a rewritable manner, judges which of the same type of software program stored in the another peripheral device and the software program stored in the memory is at least one of older and newer;
    a first rewrite unit that, when the old/new judgment unit judges that the same type of software program stored in the another peripheral device is older than the software stored in the memory, rewrites the same type of software program stored in the another peripheral device into the software program stored in the memory; and
    a second rewrite unit that when the old/new judgment unit judges that the same type of software program stored in the another peripheral device is newer than the software stored in the memory, rewrites the software program stored in the memory into the same type of software program stored in the another peripheral device.

2. A peripheral device as claimed in claim 1, wherein the type judgment unit performs judgment for all other peripheral devices connected to the network; and the old/new judgment unit performs judgment on the all other devices that are judged to store the same type of software program by the type judgment unit.

3. A peripheral device as claimed in claim 1, wherein the device judgment unit judges whether the another peripheral device is connected to the network when the peripheral device is first connected to the network.

4. A peripheral device as claimed in claim 1, wherein the device judgment unit determines that the another peripheral device is the same type as the peripheral device based on device information about the another peripheral device.

5. A network system comprising:
    a network;
    a peripheral device connected to the network; and
    another peripheral device connected to the network and having a memory that stores, in a rewritable manner, a software program to be used by the another peripheral device for executing prescribed operations, the peripheral device comprising:
    a transmission unit that performs transmission and reception of data over the network to and from the another peripheral device;

a memory that stores a software program in a rewritable manner to be used by the peripheral device for executing prescribed operations;

a type judgment unit that judges whether the another peripheral device stores a same type of software program as the software program stored in the memory of the peripheral device;

an old/new judgment unit that, when the type judgment unit judges that the another peripheral device stores the same type of software program in a rewritable manner, judges which of the same type of software program stored in the another peripheral device and the software program stored in the memory of the peripheral device is at least one of older and newer;

a first rewrite unit that, when the old/new judgment unit judges that the same type of software program stored in the another peripheral device is older than the software program stored in the memory of the peripheral device, rewrites the same type of software program stored in the another peripheral device into the software program stored in the memory of the peripheral device; and a second rewrite unit that, when the old/new judgment unit judges that the same type of software program stored in the another peripheral device is newer than the software program stored in the memory of the peripheral device, rewrites the software program stored in the memory of the peripheral device into the same type of software program stored in the another peripheral device.

6. The network system as claimed in claim 5, wherein the type judgment unit performs judgment for all other peripheral devices connected to the network; and the old/new judgment unit performs judgment on all other peripheral devices that are judged to store the same type software program by the type judgment unit.

7. The network system as claimed in claim 5, wherein at least one of the peripheral device and the another peripheral device includes a rewrite prevention unit that prevents rewrite of the software program stored in the memory of at least one of the peripheral device and the another peripheral device, and wherein the first rewrite unit or second rewrite unit does not rewrite the software program that the rewrite prevention unit prevents the rewrite of.

8. A memory medium storing programs comprising:

a first program of judging whether a peripheral device connected to a network stores, in a rewritable manner, the same type of software program as a software program stored, in a rewritable manner, in a reference memory accessible through the network;

a second program of judging which of the same type of software program stored in the peripheral device and the software program stored in the reference memory is at least one of older and newer when the peripheral device is judged to store the same type of software program in a rewritable manner;

a third program of rewriting the same type of software program stored in the peripheral device in the manner of the software program stored in the reference memory when the same type of software program stored in the peripheral device is judged to be older than the software stored in the reference memory; and a fourth program of rewriting the software program stored in the reference memory into the same type of software program stored in the peripheral device when the same type of software program stored in the peripheral device is judged to be newer than the software stored in the reference memory.

9. The memory medium as claimed in claim 8, wherein the first program judges for all other devices connected to the network; and the second program performs judgment on all other devices that are judged to store the same type software program by the first program.

10. A printer connected to a network comprising:

a device judgment unit that judges whether another printer is connected to the network;

a transmission unit that performs transmission and reception of data over the network to and from the another printer;

a memory that stores a, in a rewritable manner, firmware to be used by the printer for executing prescribed operations;

a type judgment unit that judges whether the another printer stores, in a rewritable manner, a same type of firmware as the firmware stored in the memory;

an old/new judgment unit that when the device judgment unit judges that the another printer is connected to the network and the type judgment unit judges that the another printer stores the same type of firmware in a rewritable manner, judges which of the same type of firmware stored in the another printer and the firmware stored in the memory is at least one of older and newer in version;

a first rewrite unit that when the old/new judgment unit judges that the same type of firmware stored in the another printer is older in version than the firmware stored in the memory, rewrites the same type of firmware stored in the another printer to the firmware stored in the memory; and a second rewrite unit that when the old/new judgment unit judges that the same type of firmware stored in the another printer is newer in version than the firmware stored in the memory, rewrites the firmware stored in the memory into the same type of firmware stored in the another printer.

11. A printer as claimed in claim 10, wherein the device judgment unit judges whether the another printer is connected to the network when the printer is first connected to the network.

12. A printer as claimed in claim 10, wherein the device judgment unit determines that the another printer is the same type as the printer based on device information about the another printer.

* * * * *